United States Patent [19]

Wang

[11] Patent Number: 4,484,971

[45] Date of Patent: Nov. 27, 1984

[54] METHOD AND APPARATUS FOR MAKING IMPROVED LAMINATING FILM

[75] Inventor: James C. Wang, Libertyville, Ill.

[73] Assignee: General Binding Corporation, Northbrook, Ill.

[21] Appl. No.: 529,998

[22] Filed: Sep. 7, 1983

Related U.S. Application Data

[62] Division of Ser. No. 391,874, Jun. 24, 1982.

[51] Int. Cl.³ .................... B29D 23/04; B32B 31/30
[52] U.S. Cl. ...................... 156/244.14; 156/244.17; 156/244.18; 156/244.19; 156/244.24; 156/272.2; 156/272.6; 156/498; 156/500
[58] Field of Search .................. 156/244.13, 244.14, 156/244.17, 244.18, 244.19, 244.24, 500, 498, 272.2, 272.6

[56] References Cited

U.S. PATENT DOCUMENTS

| | | | |
|---|---|---|---|
| 3,539,439 | 11/1970 | Calderwood et al. | 156/244.24 |
| 3,836,414 | 9/1974 | Staats | 156/249 |
| 3,871,947 | 3/1975 | Brekken | 156/244.24 |
| 4,064,296 | 12/1977 | Bornstein et al. | 428/35 |
| 4,095,012 | 6/1978 | Schirmer | 428/474 |
| 4,151,328 | 4/1979 | Kight | 428/483 |
| 4,188,443 | 2/1980 | Mueller et al. | 428/216 |
| 4,197,326 | 4/1980 | Wakamatsu et al. | 428/412 |
| 4,198,256 | 4/1980 | Andrews et al. | 156/229 |
| 4,198,458 | 4/1980 | Mitsuishi et al. | 428/212 |
| 4,274,900 | 6/1981 | Mueller et al. | 156/229 |

Primary Examiner—Caleb Weston
Attorney, Agent, or Firm—Hill, Van Santen, Steadman & Simpson

[57] ABSTRACT

A method and apparatus for manufacturing a film suitable for use in lamination under heat and pressure. A plurality of resins is co-extruded into concentric annuli, the inner annulus being a polyester type resin, and at least one of the outer annuli consisting of a polyolefin based resin. The co-extrusion is carried out as the extruding die is rotated about its axis. After quenching to form a multi-layer seamless tube, the tube is collapsed and heated to a temperature suitable for biaxial orientation. An air bubble is introduced into the heated tube to expand the diameter thereof and simultaneously orient the tube biaxially by molecular orientation. The biaxially oriented tube is cooled sufficiently to retain its molecular orientation, and is then collapsed. The tube is then heated to a shrinking temperature while under controlled restraint to achieve a predetermined dimension in amount of shrinkage in the film. Finally, the edges of the shrunk tube are slit to form a pair of flat films.

Additional improvements are achieved by including irradiation of the films by ultraviolet light, and by treating one of the film surfaces with a corona discharge.

18 Claims, 8 Drawing Figures

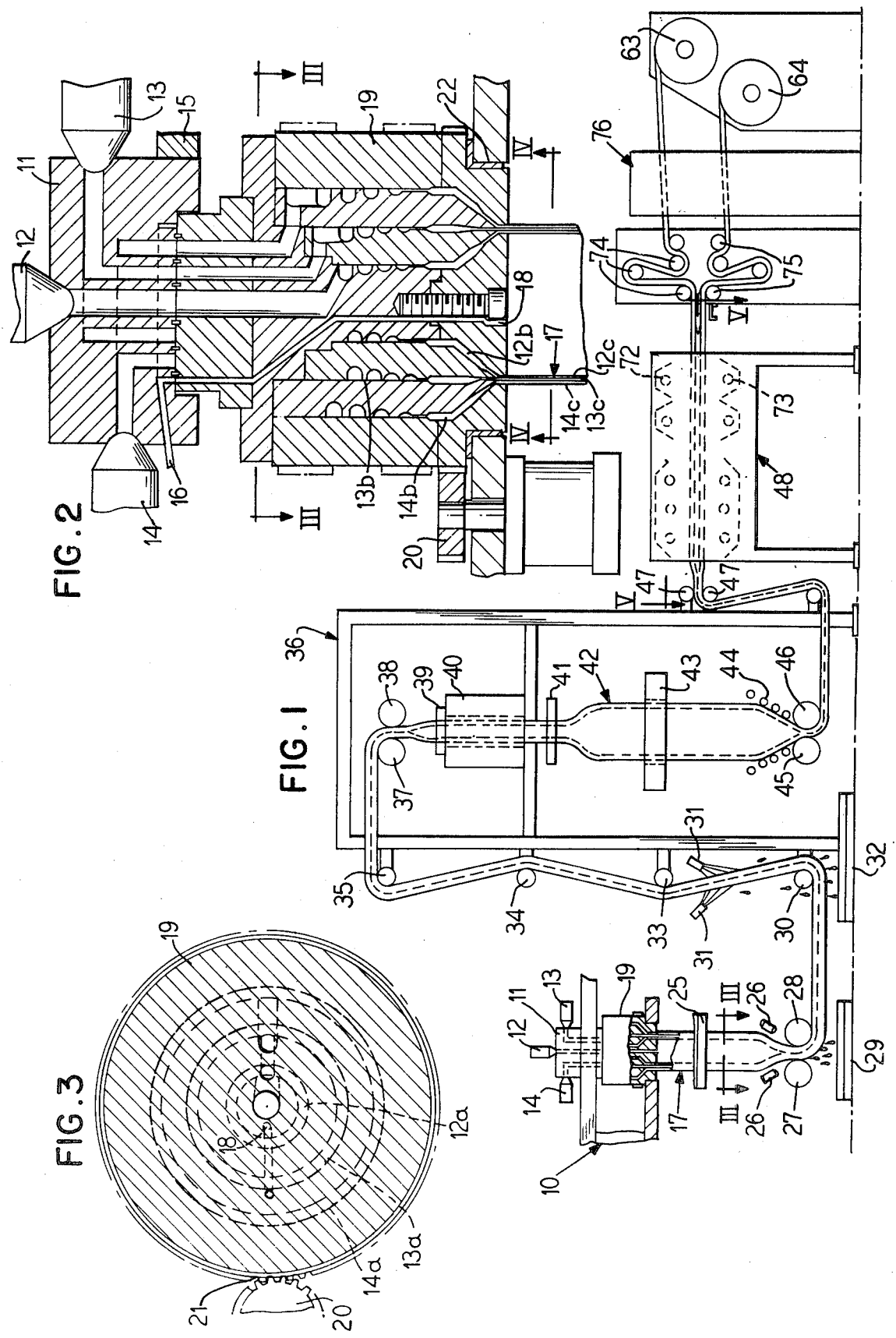

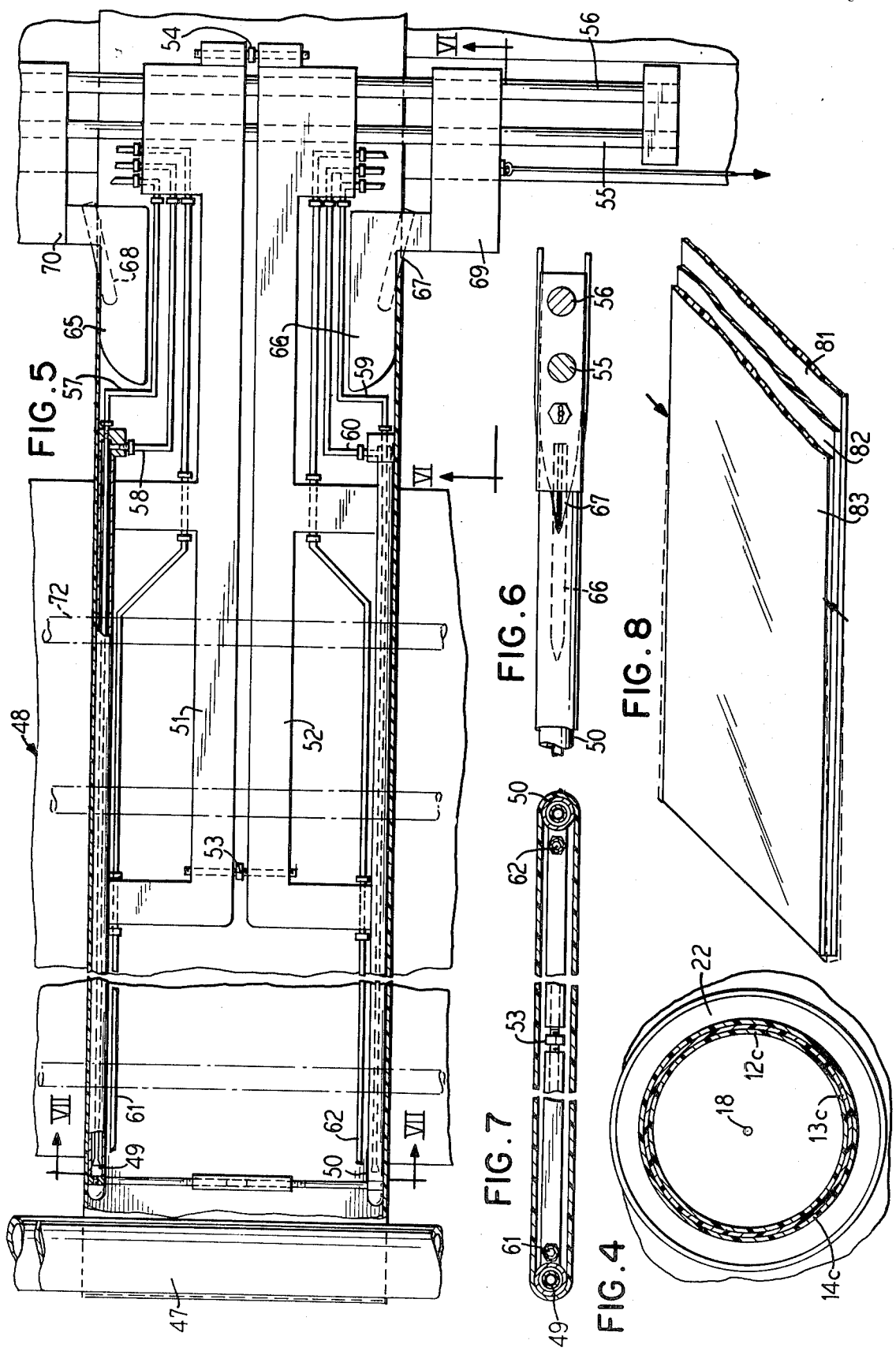

METHOD AND APPARATUS FOR MAKING IMPROVED LAMINATING FILM

This is a division, of application Ser. No. 391,874, filed June 24, 1982.

BACKGROUND OF THE INVENTION

1. Field of the Invention

The present invention is in the field of manufacturing film suitable for use as laminating film and involves coextrusion of a plurality of films of different chemical composition, biaxially orienting the same, subjecting the biaxially oriented tube to controlled sizing conditions, and then forming a pair of flat films from the tube.

2. Description of the Prior Art

Various types of heat-activated lamination systems have been used commercially for many years. Such systems are usually used for encapsulating and sealing of documents between two plastic films to protect documents and to enhance the visual appearance. Such post-lamination is usually performed in offices, schools, or graphic art shops. In the case of laminating identification cards, licenses, and the like, there are often stringent specifications and consistent high quality results are required.

The laminating films used in this type of lamination procedure usually consist of one layer of unoriented polyethylene or a copolymer thereof, and another layer of oriented and heat-set polyethylene terephthalate (PET). Typically, these materials are prepared by an extrusion coating of polyethylene or its copolymers onto an oriented PET film web.

The extrusion processes commonly used to produce packaging films, although producing usable laminating films, provide several inherent drawbacks. For one, hazy streaks and bubbles occasionally will occur as a result of contact with the hot shoes. These streaks and bubbles are caused by air bubbles which are trapped at the interface between the two layers during the coating operation. Such bubbles are usually microscopic in size but they expand into larger bubbles and cause visual defects such as streaks when subjected to certain heating conditions in the lamination step. This phenomenon only occurs from time to time. It has been known that it is influenced by process conditions, but it has not been known how to predictably cure it.

Heated roll laminators also have their own disadvantages, particularly the creation of wrinkles and the presence of uneven heating. For post-lamination applications, it is desirable that the film should shrink minutely in the transverse direction when heated so as to smooth out the film which, in turn, insures uniform heating. Laminating film produced by existing extrusion coating operations occasionally will exhibit positive dimensional change in the transverse direction of the film when heated. Although the amount of change is very small, it is very undesirable since it causes the film to wrinkle and to be heated unevenly. The reasons for this transverse growth are believed to be twofold. In the extrusion coating operation, the PET is usually heated to drive off the solvent or water from the primers. At the same time, the film is necessarily under tension in the machine direction (MD) to avoid wrinkles and the like. This combination of conditions tends to cause tensile stress in the PET film in the machine direction, and, due to the poisson's ratio of the material, a certain amount of compression stress is also effected in the transverse direction of the film. The stresses are frozen-in when film is cooled under tension. When the film is re-heated in the post-lamination step, the stresses are relieved to cause MD shrinkage and transverse growth.

Moreover, the PET film when produced by conventional flat cast procedures tends to have low transverse shrinkage which contributes to the aforementioned transverse growth problem.

Another drawback existing in conventional laminating film is inadequate interfacial adhesion for certain applications. In the manufacture of identification cards, outdoor signs, and the like, the resulting laminates must possess excellent interfacial adhesion in laminating films but must also be resistant to environmental influences such as high humidity, rain, and the like. This requirement is not met by existing laminating film technology. Although many water-resistant primers are available, they all contain residual low molecular weight fractions which, upon heating in the lamination step, tend to migrate through the polyethylene layer to the surface, causing a weakening effect on the adhesion of the laminate to the underlying document.

Another defect results from the fact that in post-laminating, the film is always contact heated either by means of heated rollers or by heated shoes. Uniform heating therefore depends on uniform contact. The presence of gauge bands which are inherent in flat die-casting and coating processes cause uneven contact, and thus cause uneven heating. Although good quality control on existing processes can reduce this problems, it cannot be eliminated completely.

There are numerous examples of multi-ply laminating films in the patented prior art, of which the following are believed to be typical examples.

Bornstein et al. U.S. Pat. No. 4,064,296 describes a heat shrinkable, multi-layer film including a layer of a hydrolyzed ethylene-vinyl acetate copolymer formed by co-extruding the hydrolyzed ethylene-vinyl acetate copolymer layer between two other polymeric layers which themselves may be ethylene-vinyl acetate copolymers. The resulting laminated structure is thereafter irradiated and oriented to produce a film which is heat shrinkable and is said to have very low oxygen permeability.

Schirmer U.S. Pat. No. 4,095,012 describes a process for producing oriented films and laminates from nylon 66 and blends thereof wherein a nylon layer is coextruded between layers of polymeric materials such as polyolefins and their copolymers to form a laminate. After quenching of the laminate, the laminated structure is oriented biaxially.

In U.S. Pat. No. 4,151,328 to Kight there is described a packaging material film including a self-adhering layer composed of a terpolymer of ethylene, a vinyl ester, and an alkenoic acid. This layer is applied onto a plasticized saran.

Mueller et al. in U.S. Pat. No. 4,188,443 describe a multi-layer polyester/polyolefin shrink film consisting preferably of five layers in which the middle layer is a polyester or copolyester, the two inner layers adjacent the middle layer are both ethylene-vinyl acetate copolymers, and the skins or outer layers are ethylene-propylene copolymers. This patent describes biaxial stretching of the two by means of internal air pressure to form a bubble.

U.S. Pat. No. 4,197,326 to Wakamatsu et al. describes a packaging tube composed of an oriented laminated film formed by stretching a composite film having an inner layer composed of an oxygen barrier thermoplastic resin confined between outer layers of a thermoplastic resin having a smaller water absorption capability than the inner layer. The oxygen barrier layer may be materials such as polyamides, PET, hydrolyzed ethylene-vinyl acetate copolymers (EVA) and polyvinyl alcohol whereas the thermoplastic resin outer films are composed of materials such as polyethylene, EVA, or polybutene.

Andrews et al. U.S. Pat. No. 4,198,256 describes a heat-sealable oriented plastic film consisting of an oriented polypropylene film covered with a heat-sealable layer consisting of a predominantly linear random copolymer of ethylene with an additional alpha-olefin having at least three carbon atoms per molecule.

In U.S. Pat. No. 4,198,458 to Mitsuishi et al. there is described a stretch-oriented laminate polyester film consisting of two or three layers of polyester films of different intrinsic viscosities. The preferred embodiment of the invention consists of a stretch-oriented laminated film and a magnetic layer coated on an external surface thereof to provide a magnetic recording medium.

U.S. Pat. No. 4,274,900 to Mueller et al. describes a multi-layer polyester/polyolefin shrink film preferably having five layers in which the middle layer is a polyester or copolyester, the two inner adjacent layers are EVA copolymers, and the skin or outer layers comprise ethylene-propylene copolymers.

SUMMARY OF THE INVENTION

The present invention provides a method of manufacturing a film suitable for use in lamination under heat and pressure which eliminates many of the objectionable features of laminating films of the prior art. Specifically, the method of the present invention in its broader aspects involves co-extruding concentric annuli of a polyester such as PET as the inner annulus and a polyolefin-based resin as the outer annulus while rotating the annuli about their common axis during extrusion. The extrusion is carried out in the absence of air at the interface between the two annuli. In the next step, the extrudate is quenched to form a multi-layer seamless tube which is thereupon collapsed and heated to a temperature in excess of the glass transition temperature, which is suitable for biaxial orientation. In the next step, an air bubble is introduced into the heated tube to expand the diameter thereof to a diameter greater than that of the original extrudate to thereby orient the tube biaxially by molecular orientation. This biaxially oriented tube is cooled sufficiently to retain its molecular orientation and then collapsed. The tube is then heated to a relatively high heat-set shrinking temperature while restraining shrinkage thereof to a predetermined, sized, dimension and finally the thus shrunk film is slit at the edges to form a pair of flat films. Additional benefits are achieved by irradiating the films by ultraviolet light during and/or after the controlled shrinkage step to enhance the interfacial adhesion. In addition, the slitting of the tube into flat films is advantageously followed by a treatment of the film surfaces in a texturizing process which roughens the surface of the film, and in turn, is followed by treatment with a corona discharge.

The particularly preferred form of the present invention involves co-extrusion of three annuli, the PET resin constituting the inner annulus, and different EVA resins constituting the middle and outer annuli.

The present invention also provides an improved laminating film and an end product and also an improved film tube spreader and support which provides the controlled amount of shrinkage in the tube prior to slitting.

The laminating film of the present invention has no entrapped air bubbles at the interface of the layers because the layers are co-extruded and the interface is never in contact with air. This eliminates visual defects such as streaks caused by entrapped bubbles.

The improved film has desirable transverse shrinkage and never exhibits undesired transverse growth because of the novel co-extrusion and co-orientation process. In accordance with this process, solvent or water drying is eliminated, and the machine direction stress under heat is also eliminated. Furthermore, it was found that the process of the present invention produces films with increased amount of transverse shrink to start with. This combination eliminates the transverse growth and the wrinkles and uneven heating caused by it.

Delamination problems are also eliminated and interfacial adhesion which is insensitive to the environment is provided between the film layers.

The oscillation or rotation of the extrusion dies and other hardware in the manufacture of the film virtually eliminates the gauge band problem, and thus eliminates the uneven heating and wrinkling problems associated with it.

BRIEF DESCRIPTION OF THE DRAWINGS

The drawings illustrate a preferred form of apparatus for use in the process of the present invention and are identified as follows:

FIG. 1 is a somewhat schematic showing of an overall production line embodying the improvements of the present invention;

FIG. 2 is a cross-sectional view on an enlarged scale illustrating a portion of one embodiment of the co-extrusion mechanism in accordance with the present invention;

FIG. 3 is a cross-sectional view taken substantially along the line III—III of FIG. 2;

FIG. 4 is a cross-sectional view taken substantially along the line IV—IV of FIG. 2;

FIG. 5 is a view taken substantially along the line V—V of FIG. 1;

FIG. 6 is a view taken substantially along the line VI—VI of FIG. 5;

FIG. 7 is a view taken substantially along the line VII—VII of FIG. 5; and

FIG. 8 is a broken-away view ilustrating the three-ply laminating film of the present invention.

DESCRIPTION OF THE PREFERRED EMBODIMENTS

In FIG. 1, reference numeral 10 indicates generally a coextrusion apparatus for use in accordance with the principles of the present invention. It includes a distribution ring 11 which is fed by three nozzles, a centrally disposed nozzle 12 which injects the PET resin, and side nozzles 13 and 14 which are used to inject the materials which are to be laminated to the central annulus of PET. For example, the material injected through the nozzle 13 which forms the middle annulus of the three-ply structure may be EVA containing about 8% by weight vinyl acetate. The resin injected through the nozzle 14 may, for example, be EVA having a 4% vinyl acetate concentration. The outside layer serves to bond itself more securely to the underlying substrate, while the material of the middle layer serves to bind the outer EVA layer to the inner PET layer. The PET function as an ultraviolet absorbing layer, while the EVA layers are ultraviolet transmitting layers. In place of the PET, other high temperature resisting materials such as polycarbonate resins, polybutene terephthalate resins, and the like, can be employed.

In place of the EVA, other olefinic resins such as ethylenic copolymers including ionomers can be employed.

One embodiment of the die arrangement is illustrated in FIG. 2. There, the distributing head 11 is fixedly mounted on a support 15. It is also provided with an air inlet pipe 16 for forming the co-extrudates into the form of a tube 17 during coextrusion. The air inlet pipe 16 communicates with a centrally disposed passage 18 in a centrally disposed rotatable extrusion head 19. The extrusion head 19 may be rotated during extrusion by various means. As illustrated, a drive gear 20 engages teeth 21 formed in the exterior of the extrusion head 19. A bearing 22 permits relative rotation between the extrusion head 19 and the distributor head 11.

As best seen in FIG. 3, the three resinous compositions are delivered to arcuate segments 12a, 13a, and 14a, respectively, at the top of the rotating extrusion head 19. These arcuate slots merge into continuous annular rings 12b, 13b, and 14b, respectively, at the base of the rotatable extrusion head 19, so that upon extrusion, continuous annuli 12c, 13c and 14c are co-extruded as best seen in FIG. 4. Since the extruding surfaces come together in the absence of air, there is no possibility of entrapping air bubbles which could lead to streaks.

Returning to FIG. 1, the extruded tube 17 while still hot is passed through a water ring 25 to quench the external surface of the extruded tube 17. The water is sufficiently cold to fastquench the tube and reduce crystallinity in the PET so that the PET either stays amorphous or has low crystallinity (less than 25%). Additional water quenching is effected by a plurality of water spray devices 26 as the tube is collapsed between a pair of nip rollers 27 and 28. During passage between the rollers 27 and 28, water is stripped from the exterior surface of the extruded tube and falls into a pan 29. Additional amounts of water are stripped from the tube by training the same over a roller 30 and contacting the tube with air jets 31 which blow the remaining surface water down into a collecting pan 32.

The dried extruded tube is then guided by means of rollers 33, 34, and 35 into an extrusion tower generally indicated at reference numeral 36. Within the tower, the flattened tube passes between a pair of nip rollers 37 and 38 which further flatten the same and then through an iris 39. The interior of the tube is reopened at this point, by air inside the tube. As it is reopened, the tube passes through a heater 40 in which it is heated to a temperature suitable for biaxial orientation. Such temperature is usually in excess of the glass transition temperature of PET. If necessary, an air ring 41 can be provided to adjust the neck of the tube to a temperature most suitable for biaxial orientation.

Air trapped within the tube serves to form a bubble within the tube which causes the tube to expand to a diameter about three to four times the diameter of the orignal extruded tube 17, forming an enlarged diameter tube 42 which is biaxially oriented. The tube then passes through a cooling air ring 43 which reduces the temperature on the tube, before it is again collapsed by passing through a collapsing frame 44 and then into the nip between a pair of rollers 45 and 46.

After passing between rollers 47, the flattened tube is then subjected to controlled heat-set and ultraviolet irradiation. The heat-set is accomplished by means of a heater-spreader generally indicated at reference numeral 48 and shown in detail at FIGS. 5 to 7, inclusive.

The spreader consists of a pair of conduits 49 and 50 in spaced cantilevered relation as seen in FIG. 7. The spacing between the two conduits 49 and 50 is controlled by a pair of frame members 51 and 52, respectively, connected to the two conduits. The spacing between the frame members is controlled by means of adjusting means 53 and 54 extending between the two frame members. The ends of the frame members 51 and 52 are received in sliding relation along a pair of rods 55 and 56.

A coolant such as water is circulated through each of the conduits 49 and 50. A water inlet pipe 57 serves to introduce the circulating water into the conduit 49, and discharge line 58 is provided to return the coolant to the source. Similarly, a water inlet line 59 and a discharge line 60 are provided for circulating cooling water through the conduit 50.

The flattened tube is fitted over the spreader 48 and may be opened by the introduction of air through air lines 61 and 62. The tube is thus slightly distended in being pulled over the spreader which prevents it from shrinking beyond a controlled amount.

The tube as it enters the spreader 48 has a room temperature but is heated to a heat-set temperature of about 400° F., above the highest temperatures used in expected subsequent lamination processes in which the film will be used. All the time the tube is on the spreader, it is under longitudinal tension provided by take-up rollers 63 and 64 (FIG. 1).

A pair of arcuate guides 65 and 66 is provided beyond the end of the spreader to provide guide means for directing the tube for the slitting operation. Slitting knives 67 and 68 are fixedly secured to slides 69 and 70, respectively, which slides are adjustably positionable by being slidably mounted on the rods 55 and 56 as shown in FIG. 5. Relative position of the slides 69 and 70 dictates the position in which the slitting knives 67 and 68 sever the elongated tube into a pair of flat face-to-face films.

Before the flat films are cooled down below 230° F., they are subjected to irradiation by banks 72 and 73 of ultraviolet lights. These lights serve to improve the adhesion between the layers making up the films.

After treatment with the ultraviolet light, the films may be texturized on their outwardly facing surfaces by passing the same into contact with rollers 74 for one of the surfaces and rollers 75 for the other. These texturizing rollers are used to create a rough surface on the EVA side of the film. The rough surface is desirable for eliminating air bubbles and the like and helps winding up the same on the rolls.

Following the texturizing, the films may be subjected to treatment in a zone 76 in which a corona discharge device is located. This technique provides enhancement of adhesion to the substrate in post-lamination operations.

The final product is illustrated in FIG. 8 of the drawings. The interior laminate 81 comes in contact with the substrate and consists of a roughened, corona treated EVA film. Tightly secured to the film 81 is the intermediate binder film 82 consisting of an EVA polymer having a higher content of vinyl acetate than the film 81. Finally, the outer film 83 consists of oriented, heat-set PET of good optical clarity.

The present invention provides a film which still retains some transverse shrinkage property making it ideally suited for use in post-lamination procedures. In most other applications for oriented, heat-set PET films, it is usually desirable to minimize the shrinkage, not to encourage it.

Although co-extrusion has been known in some cases to provide a film of good clarity, such co-extrusion is used in the present instance to eliminate the heat-activated bubbling problem which has been very troublesome.

Moreover, although ultraviolet light at elevated temperatures is known to enhance adhesion between certain layers of plastic materials, it is found that in this case, the ultraviolet light has to be used after the orientation step to be effective. When ultraviolet light is used before orientation, the adhesion achieved is almost completely lost after orientation.

It should be evident that various modifications can be made to the described embodiments without departing from the scope of the present invention.

I claim as my invention:

1. The method of manufacturing a film suitable for use in lamination under heat and pressure which comprises:
   (1) co-extruding concentric annuli of a polyester as the inner annulus and a polyolefin based resin as the outer annulus while rotating said annuli about their common axis during extrusion,
   (2) quenching the extrudate to form a multi-layer seamless tube,
   (3) heating the tube to a temperature suitable for biaxial orientation,
   (4) providing an air bubble in the heated tube to expand the diameter thereof to a diameter greater than that of the original extrudate to thereby orient the tube biaxially by molecular orientation,
   (5) cooling the biaxially oriented tube sufficiently to retain its molecular orientation,
   (6) collapsing the tube,
   (7) heating the tube to a heat-set temperature in excess of the temperature at which the film is to be laminated while restraining shrinkage thereof to a predetermined dimension, and
   (8) slitting the edges of the tube to form a pair of flat films which retain some transverse shrinkage properties.

2. A method according to claim 1 in which: said polyester resin is polyethylene terephthalate.

3. A method according to claim 1 in which: said polyolefin based resin is an ethylene-vinyl acetate copolymer.

4. A method according to claim 1 in which: irradiation of the films by ultraviolet light to enhance the interfacial adhesion is incorporated in step (7) when film temperature is above 230° F.

5. A method according to claim 1 in which: the slitting of step (8) is followed by texturizing treatment of the olefinic film surface.

6. A method according to claim 5 in which: the treatment of the olefinic film surface is followed by treatment of the surface of the slit film with corona discharge.

7. The method of manufacturing a film suitable for use in lamination under heat and pressure which comprises:
   (1) co-extruding concentric annuli of a polyester resin as the inner annulus, an adhesive, polyolefin based resin as a middle annulus, and a polyolefin based resin having adhesive properties toward the desired substrate as the outer annulus while rotating said annuli about their common axis during extrusion,
   (2) quenching the extrudate to form a three-layer seamless tube,
   (3) collapsing the tube,
   (4) heating the collapsed tube to a temperature suitable for biaxial orientation,
   (5) providing an air bubble in the heated tube to expand the diameter thereof to a diameter greater than that of the original extrudate to thereby orient the tube biaxially by molecular orientation,
   (6) cooling the biaxially oriented tube sufficiently to retain its molecular orientation,
   (7) collapsing the tube,
   (8) heating the tube to a heat-set temperature in excess of the temperature at which the film is to be laminated while restraining shrinkage thereof to a predetermined dimension, and
   (9) slitting the edges of the tube to form a pair of flat films which retain some transverse shrinkage properties.

8. A method according to claim 7 wherein said inner annulus is composed of polyethylene terephthalate, said middle annulus is composed of an ethylene-vinyl acetate copolymer, and said outer annulus is composed of an ethylene-vinyl acetate copolymer having a smaller proportion of vinyl acetate than said middle annulus.

9. A method according to claim 7 in which: irradiation of the films by ultraviolet light to enhance the interfacial adhesion is incorporated in step (8) when film temperature is above 230° F.

10. A method according to claim 7 in which: the slitting of step (9) is followed by texturizing of the olefinic film surface.

11. A method according to claim 10 in which: the film surface is treated with a corona discharge.

12. An apparatus for manufacturing a laminating film which comprises:
   a co-extrusion head arranged to extrude a plurality of coaxial abutting annuli of differing compositions,
   means for rotating said co-extrusion head during such extrusion,
   quenching means disposed beyond said co-extrusion head and arranged to quench the extrudate leaving said coextrusion head,
   first pressure rollers located beyond said quenching means and arranged to flatten the extruded and quenched annuli into a multi-layer seamless tube,
   first heater means receiving the flattened tube and arranged to heat said tube to a biaxial orientation temperature,
   means for expanding the heated flattened tube to a diameter greater than that of said annuli while simultaneously biaxially orienting the same,
   cooling means positioned to cool the biaxially oriented tube sufficiently to control the orientation layer,
   second pressure rollers located beyond said cooling means and arranged to flatten the biaxially oriented tube, second heater means located beyond said second pressure rollers and arranged to heat the flattened tube to a heat-set temperature, a spreader positionable inside said flattened tube and arranged to support the tube and limit the amount of film shrinkage induced by said second heater means, and slitter means following said spreader arranged to slit said tube along its edges into a pair of flat films.

13. An apparatus according to claim 12 which includes: ultraviolet irradiation means disposed within said spreader for enhancing the interfacial adhesion of the film.

14. An apparatus according to claim 12 which includes: a corona discharge device located downstream of said slitter means and positioned to treat a surface of the films.

15. An apparatus according to claim 14 which includes:

a texturizing means immediately preceding said coronaa discharge means and arranged to roughen the outer surface of the film.

16. The method of claim 1 wherein said heat-set temperature is about 400° F.

17. The method of claim 7 wherein said heat-set temperature is about 400° F.

18. The apparatus of claim 12 wherein said heat-set temperature is about 400° F.

* * * * *